(12) United States Patent
Heid et al.

(10) Patent No.: US 10,063,054 B2
(45) Date of Patent: Aug. 28, 2018

(54) POWER MANAGEMENT IN AN ENERGY DISTRIBUTION SYSTEM

(71) Applicant: Siemens Aktiengesellschaft, Munich (DE)

(72) Inventors: Günter Heid, Rutesheim (DE); Peter Michael Holzapfel, Althengstett / Neuhengstett (DE); Thomas Pflugfelder, Moeglingen (DE)

(73) Assignee: Siemens Aktiengesellschaft, Munich (DE)

( * ) Notice: Subject to any disclaimer, the term of this patent is extended or adjusted under 35 U.S.C. 154(b) by 755 days.

(21) Appl. No.: 14/409,975

(22) PCT Filed: Feb. 13, 2013

(86) PCT No.: PCT/EP2013/052821
§ 371 (c)(1),
(2) Date: Dec. 19, 2014

(87) PCT Pub. No.: WO2013/189613
PCT Pub. Date: Dec. 27, 2013

(65) Prior Publication Data
US 2015/0155714 A1 Jun. 4, 2015

(30) Foreign Application Priority Data
Jun. 22, 2012 (DE) .................... 20 2012 006 090 U

(51) Int. Cl.
*H02J 3/32* (2006.01)
*H02J 3/28* (2006.01)
*F02B 63/00* (2006.01)

(52) U.S. Cl.
CPC ................ *H02J 3/28* (2013.01); *F02B 63/00* (2013.01); *H02J 3/32* (2013.01)

(58) Field of Classification Search
CPC ....................................... H02J 3/28; H02J 3/32
See application file for complete search history.

(56) References Cited

U.S. PATENT DOCUMENTS

| 5,939,798 A * | 8/1999 | Miller | H02J 9/062 307/43 |
| 6,025,701 A | 2/2000 | Weinhold | |

(Continued)

FOREIGN PATENT DOCUMENTS

| CN | 102208824 | 10/2011 |
| CN | 102237688 | 11/2011 |

(Continued)

OTHER PUBLICATIONS

Narain G. Hingorani et al; "Understanding FACTS: Concepts and Technology of Flexible AC Transmission Systems"; John Wiley & Spms. Inc. Hoboken, NJ, New York; ISBN: 978-0-7803-3455-7; XP002725809; 1999; US.

(Continued)

*Primary Examiner* — Fritz M Fleming
(74) *Attorney, Agent, or Firm* — Cozen O'Connor

(57) ABSTRACT

An arrangement for power management in an energy distribution system, a method for power management in an energy distribution system and an arrangement for implementing the method for power management in the energy distribution system, wherein a feed/return unit and a control unit are provided, where the control unit is configured to sense a present actual system state and to take the sensed actual system state as a basis for prompting energy output or energy intake (energy out/intake, energy feed/return) by the feed/return unit in order to allow continuous correction and dynamic support of an energy distribution system or in an energy distribution system.

8 Claims, 2 Drawing Sheets

(56) References Cited

U.S. PATENT DOCUMENTS

| | | |
|---|---|---|
| 7,406,370 B2 | 7/2008 | Kojori et al. |
| 2002/0041126 A1 | 4/2002 | Provanzana et al. |
| 2002/0051368 A1 | 5/2002 | Ulinski et al. |
| 2009/0312885 A1 | 12/2009 | Buiel |
| 2010/0270864 A1* | 10/2010 | Vyas .................. H02J 7/35 307/82 |
| 2011/0137481 A1* | 6/2011 | Manz .................. H02J 7/35 700/291 |
| 2012/0183814 A1* | 7/2012 | Boegershausen .......................... H01M 8/04268 429/7 |

FOREIGN PATENT DOCUMENTS

| | | | |
|---|---|---|---|
| CN | 102377192 | 3/2012 | |
| DE | 19933069 | 11/2000 | |
| DE | 102006030751 A1 * | 12/2007 | ............. H02J 3/383 |
| EP | 2317640 A1 | 5/2011 | |
| RU | 2298867 | 5/2007 | |
| RU | 2426215 | 8/2011 | |
| WO | WO 9636097 A2 | 11/1996 | |
| WO | WO 2009/150413 | 12/2009 | |

OTHER PUBLICATIONS

Kong, Lingyi et al. "Application of Battery Energy Storage System in Power System" Electric Switchgear, 2008; pp. 61, 62 and 64; claim 3, 2008.

Wu, Fubao et al. "The Application of Large-Capacity Battery Energy Storage System (BESS) and its Representative Design" The 13th Annual Meeting of China Association for Science and Technology, Parallel Session 15—Memoir for the Seminar Regarding Large-Scale Development and Application of Energy Storage Technology; pp. 1-6; claims 1-10, 1972.

Office Action dated Jun. 1, 2017 which issued in the corresponding Chinese Patent Application No. 20138003240.6.

Office Action dated Jan. 4, 2018 which issued in the corresponding Chinese Patent Application No. 201380032340.6.

"Energiespeicher", Wikipedia, Apr. 5, 2017, (16 pages).

* cited by examiner

POWER MANAGEMENT IN AN ENERGY DISTRIBUTION SYSTEM

REFERENCE TO RELATED APPLICATIONS

This is a U.S. national stage of application No. PCT/EP2013/052821 filed 13 Feb. 2013. Priority is claimed on German Application No. 202012006090.2 filed 22 Jun. 2012, the content of which is incorporated herein by reference in its entirety.

BACKGROUND OF THE INVENTION

1. Field of the Invention

The invention relates to an arrangement for power management in an energy distribution network, a method for power management in the energy distribution network and to an arrangement for implementing the method for power management in the energy distribution network.

2. Description of the Related Art

Combustion engine/generator units combine combustion engines (also combustion engine unit) that convert chemical energy of a fuel, such as a liquid or gaseous fuel, by combustion into mechanical energy with generators (also generator unit) that further convert this mechanical energy into electrical energy.

Combined units of this type, comprising combustion engines and generators, thus generate electrical energy (i.e., a generator source) to feed the electrical energy into an (electrical) energy distribution network or rather to make the electrical energy available to the energy distribution network.

A gas-operated combustion engine is a subassembly of the combustion engines that uses as fuel, in lieu of liquid fuels, such as petrol, diesel, heavy oils, etc. as is the case with combustion engines that are operated by liquid fuels, natural gas, liquid gas, wood gas, biogas, landfill gas, methane, furnace gas or hydrogen.

Due to the special characteristics of a combustion engine/generator unit or rather of a combustion engine and/or generator that is operated in a combustion engine/generator unit so as to feed (electrical) energy into an energy distribution network, such as sluggish performance of the fuel of the combustion engine and/or inertia of rotating components of the combustion engine/generator unit (dynamic effects), it can occur that the combustion engine/generator unit generates energy peaks in the case of (actual) rotational speeds of the combustion engine that deviate from desired rotational speeds, and this has a disturbing effect on the energy distribution network.

In addition, it is possible, by way of example due to a drop or an increase in a network voltage in the energy distribution network (e.g., short circuit in the network), for network disturbances to occur that in turn have a loading or unloading effect on the combustion engine/generator unit.

It is generally ensured by closed loop control of a "(performance) sluggish" generator in a combustion engine/generator unit, the control being performed using closed loop control technology, that a phase position and frequency are compensated for to compensate for fluctuations in power/changes in power levels in the energy distribution network.

In future, a temporary (actual) deviation from the desired state of the energy distribution network will no longer be accepted by a network operator.

A legally prescribed ability to generate a phase shift between current and voltage (reactive power) in the energy distribution network in order thereby to maintain a network current can be achieved or rather is achieved normally by over-dimensioning the generator of the combustion engine/generator unit and/or the transfer elements, in other words components of the energy transfer chain of the combustion engine/generator unit to the energy distribution network. However, this is encumbered with increased material costs and/or cost outlay. Also, the component volumes can increase.

In order to avoid the mentioned network disturbances, in particular disturbances caused by deviating (actual) rotational speeds of the combustion engine of the combustion engine/generator unit, appropriate measures, in particular in the form of continuously correcting and dynamically supporting the energy distribution network, are therefore desired or rather necessary with respect to these and/or other, network disturbances.

Moreover, static energy feed/return units, in other words electric circuits, are known for drawing power and also for returning power into an energy distribution network or rather alternating current network. DE 199 33 069 A1 describes a static energy feed/return unit having a direct voltage intermediate circuit that is connected by way of an indirect converter to an energy distribution network.

As of Apr. 2, 2013, (Electrical) converters are known from the website known as wikipedia.

A converter, also described as an alternating current converter or as an AC/AC converter, is a current converter, in other words an idle or rather static "installation" for converting one type of electrical current into another type with the aid of electronic components such as transistors, i.e., IGBT, MOSFET, diodes or thyristors that generate from one alternating voltage an alternating voltage that is different in frequency and amplitude.

Different topologies of converters are known, such as direct or indirect converters.

Indirect converters operate with an intermediate circuit that is operated with direct voltage or direct current and represent a combination of a rectifier (converting from alternating voltage into direct voltage) and an inverter (converting direct voltage into alternating voltage or rather direct current into alternating current).

If the converter or rather the rectifier or inverter is able to transfer in both directions, in other words into the intermediate circuit and out of the intermediate circuit, this is referred to as a converter that is capable of a two quadrant operation or rather a four quadrant operation or rather a converter that operates/functions in the two or rather four quadrant operation.

Indirect converters having direct voltage in the intermediate circuit, in English voltage-source-inverter (VSI), comprise a three phase rectifier, a direct voltage circuit, in which the direct voltage is almost constant at the capacitor C as an energy storage device in the intermediate circuit, and an output-side inverter.

Indirect converters having direct voltage in the intermediate circuit, in English current-source-inverter (CSI), comprise a three phase rectifier with phase angle control, an intermediate circuit having a storage choke L as an energy storage device through which, in the case of a constant load, a constant direct current flows, and an output-side inverter.

As of Apr. 2, 2013, it is known from wikipedia to classify energy storage devices into categories with corresponding examples and characteristics of energy storage devices of this type.

Accordingly, energy storage devices can be classified into categories:

(i) thermal energy storage devices (thermal storage devices, district thermal storage devices, thermochemical thermal storage devices, latent heat storage devices);

(ii) chemical energy storage devices: (inorganic: galvanic cell (rechargeable battery, battery), Redox Flow cell, hydrogen, battery storage power plant, organic: ADP, ATP, AMP, glycogen, carbohydrates, fats, chemical hydrogen storage device);

(iii) mechanical energy storage devices (kinetic energy (energy derived from movement): flywheel or rather flywheel storage device; potential energy (position energy): spring, pump storage power plant, compressed air storage power plant, piston storage power plant); and (iv) electrical energy storage devices (capacitor, superconductive magnetic energy storage device).

SUMMARY OF THE INVENTION

It is an object of the present invention is to provide a continuous correction and dynamic support of an energy distribution network and accordingly in an energy distribution network.

This and other objects and advantages are achieved in accordance with the invention by providing an arrangement for power management in an energy distribution network, a method for power management in the energy distribution network and also an arrangement for implementing the method for power management in an energy distribution network in which a control unit (4) is configured such that a prevailing actual network state of the energy distribution network (2) is ascertained and, in dependence upon the ascertained actual network state, energy of the energy feed/return unit (3), is output or received (energy output/intake, energy feed/return) in particular in the energy distribution network (2).

The invention and the described further developments can be implemented (also in parts) both in software and also in hardware, for example, by using a special electric circuit. In particular, the arrangement for implementing the method for power management in an energy distribution network can be implemented as software or rather as a computer program or rather as a computer program product/commodity, such as control software.

The arrangement in accordance with the invention for power management in an energy distribution network provides a static energy feed/return unit (hereinunder referred to as energy feed/return unit), and also a control unit.

The term 'energy feed/return unit of this type' is understood to mean an electric unit or rather arrangement/circuit that is able to draw (electrical) energy from an (electrical) energy distribution network, such as from a local low voltage network and also to return (electrical) energy (effective energy) into the energy distribution network and/or to generate reactive power (in order to maintain a network current) in the energy distribution network, in other words to generate on the network side a phase shift with respect to one another of electrical variables in particular of current and voltage, (power/energy management, energy feed/return).

In particular, the energy feed/return unit can be coupled to an energy distribution network, such as to a local low voltage network. Other units, such as in particular energy generating units (in short also only energy generators), can likewise be coupled to the energy distribution network.

The particular location at which the energy feed/return unit is coupled to the energy distribution network, and at which energy can be fed into or drawn from the energy distribution network (supporting power output/intake, generating reactive power) in the distribution network, is to be referred to hereinunder as the energy transfer point/energy feed-in point.

The energy feed/return unit can comprise, for example, a converter that can be operated in a two or rather four quadrant operation (hereinunder referred to—in the special design—also as a local grid inverter (LGI)), in particular a line commutated inverter or rectifier in the two quadrant operation, and also a direct current intermediate circuit that is connected to the inverter or rather the rectifier (hereinunder also referred to only as direct current circuit), and the inverter or rather rectifier then feeds energy to the direct current intermediate circuit or rather draws energy from the direct current intermediate circuit.

One or multiple DC-AC converters and/or DC-DC converters can be connected or rather are to be connected to the direct current intermediate circuit for the purpose of converting energy into a thermal or chemical or mechanical form of energy.

One of the (thermal or chemical or mechanical) energy storage devices that correspond to the (thermal or chemical or mechanical) form of energy or rather respective energy storage devices (energy module) that correspond to the (thermal or chemical or mechanical) form of energy can be connected or rather are to be connected to the converter or rather converters, the energy storage devices being by way of example a flywheel storage device (mechanically rotating) or a battery or rather fuel cell (chemically inorganic).

Thermal, chemical and mechanical energy storage devices of this type are characterized by aging effects such as also their charging and discharging is performed in the time period of—greater—several milliseconds.

Furthermore, the direct current intermediate circuit can be connected to one or multiple electrical (also referred to here as physical) energy storage device(s), such as a capacitor and/or a superCAP.

Electrical or rather physical energy storage devices of this type render it possible (in contrast/different to the thermal, chemical and mechanical energy storage devices) to perform a charging and discharging procedure in a highly dynamic manner, in a short space of time, in other words in the region of one or several milliseconds and in an aging resistant manner.

The energy storage devices that are connected to the direct current circuit have the physical characteristic that a phase shift of electrical variables with respect to one another, in particular between current and voltage, is generated on the network side, as a consequence of which reactive power can be generated in the energy distribution network to maintain a network current.

Additionally, the energy storage devices that are connected to the direct current circuit have the physical characteristic that energy is drawn from an energy distribution network or that energy is to be supplied to an energy distribution network. As a consequence, effective energy can be introduced into the energy distribution network or drawn therefrom (supporting power).

The transport of energy is encumbered with response times according to the physical or rather chemical characteristics of the energy storage devices and the electrical characteristics of their converters, or rather the converters. The energy storage devices can therefore be selected according to the required response time or rather the energy storage devices can be arranged and coordinated in combination to cover the required response time periods.

In other words, the energy storage devices can be dimensioned/combined/coordinated in particular such that highly dynamic correcting variables can be derived from the physical storage, and less dynamic correcting variables can be derived from the thermal and/or chemical and/or mechanical storage device. The limit for drawing energy from the physical storage device or rather from the thermal/chemical/mechanical energy storage device is defined according to economic restraints.

In particular, the dimensioning/combination/coordination of the energy storage devices can be provided such that higher frequency cyclic charging and discharging procedures are avoided in a chemical storage device.

It is preferred that the energy storage devices that are connected to the direct current circuit are also dimensioned such that specified (by its energy storage/output/intake) symmetrical cyclic energy fluctuations in an energy distribution network and/or that an acyclic energy surplus or a shortage of energy in the energy distribution network (by the network being discharged or charged) can be compensated for (network disturbance).

In addition, the energy content of the storage devices can be dimensioned such that the (desired) output that is specified by one (or multiple) energy generating unit(s), such as a combustion engine/generator unit, can be supplied to or drawn from the energy distribution network for a period of time of a specified insufficient or surplus output of the generating unit(s) (by discharging or rather charging the energy storage devices).

Energy can be automatically charged into the physical energy storage device in the direct current circuit via the desired set value/intermediate circuit voltage.

Energy can be charged into the thermal and/or chemical and/or mechanical energy storage device(s) particularly by a preceding disturbance-free operation of an energy generating unit, such as operation of a gas-operated combustion engine/generator unit or an inverter unit (exhaust gas micro turbine) that is operated by waste heat.

Any other generator sources, such as those based on renewable energies (e.g., wind, water, light (photovoltaic) amongst others) are possible for charging the thermal, chemical and/or mechanical energy storage device(s).

It is also possible to charge the thermal, chemical and/or mechanical energy storage device(s) via the energy distribution network (by way of the energy feed/return unit or rather by way of the line commutated converter) itself.

It is expedient to monitor the charge state of the thermal, chemical and/or mechanical energy storage device(s) accordingly, and/or to control said thermal, chemical and/or mechanical energy storage device(s) in an open loop or closed loop manner. In particular, the charge state of the storage device can be maintained at 80%-90%.

Once the storage charge is completed, the energy provided by a generating source of this type can be supplied via the energy feed/return unit or rather via the line commutated converter and to the energy transfer point, or rather the energy feed-in point to the energy distribution network, or also directly to the energy distribution network, in order to increase the total efficiency level of the system.

The control unit in accordance with the invention, in particular a (functional) measuring, closed loop control and/or open loop control unit (hereinunder—in the special design—also referred to as a local grid controller (LGC)) is configured so as to ascertain a prevailing actual network state of an energy distribution network, in particular respective electrical variables, such as voltage, current, phase position and/or frequency, in particular promptly, and in dependence upon the ascertained actual network state cause energy to be output or also received (energy output/intake, energy feed/return) of the energy feed/return unit, in particular into or out of the energy distribution network.

It is possible to provide that the ascertained actual network state is compared with a pre-determinable (desired network) state, such as in the form of a desired or safety-relevant limit value—and in dependence upon the comparison cause energy to be output or also to be received (energy output/intake, energy feed/return), in particular into or out of an energy distribution network, of the energy feed/return unit.

Simply and clearly expressed, the control unit in accordance with the invention "coordinates/manages" the energy feed/return unit, in particular its energy/power management system, (amongst others energy feed/return, energy output/intake) in particular in dependence upon a state of an energy distribution network, in order to compensate for respective disturbances, in particular in a dynamic, prompt and/or surge-free manner.

In the case of this "coordination/management", it is also possible, by their "coordination/management" via the control unit, to prevent damage, as a result of a limit value being exceeded, to the feed/return unit or rather its components, the components being, for example, its storage device and/or circuit/transfer components, and/or other components/circuits/components/elements of other participating elements, such as other transfer elements and/or energy generating unit(s) (also referred to hereinunder only as generator sources), by way of example combustion engine/generator unit(s), (all together in the entire system referred to hereinunder also only as generator-transfer-storage units).

This "coordination/management" can reside in the fact that charging/discharging procedures or rather charge states of the energy storage devices in the case of the energy feed/return unit are controlled in an open loop and/or closed loop manner and/or that the closed loop controls of a combustion engine and of a generator of a combustion engine/generator unit are coordinated with one another.

In particular, it is expedient that the control unit comprises a model of the participating generator-transfer-storage unit, and based on this model corresponding responses of the participating generator-transfer-storage unit (within the scope of the "coordination/management") are coordinated in order in this manner to be able to (pre-)control the entire system with all participating components surge-free and dynamically in a suitable manner.

It can be particularly provided that closed loop control units of the participating generator-transfer-storage units, such as closed loop control units of energy generator units (such as combustion engine management or closed loop generator control in the case of a combustion engine/generator unit) and the control unit, in particular from the central location, independence upon requirements of the energy distribution network, are coordinated with one another using closed loop control technology.

This can occur in an expedient manner via a process display archive that contains operating events.

The coordinated "coordination/management" is to be provided in particular in the case of combustion engine/generator units in the entire system due to the special characteristics of a combustion engine, in particular of a gas combustion engine, (sluggish performance) of a combustion engine/generator unit of this type, because the combustion engine must be dynamically controlled by influencing an ignition process or rather the point in time that ignition occurs or rather mixture preparations (engine management) in a particular manner in order to be able to dynamically compensate for any deviation from the prevailing operating point or rather energy peak in the form of excess rotational speed.

In order to be able to dynamically control, in an open loop manner, a power output of the combustion engine, a partial switch-off of ignition circuits is appropriate and it is also appropriate to influence the point in time at which ignition occurs.

Thus, in the event of an electrical load shedding, rotational speeds of gas-operated combustion engines tend to over-vibrate because the energy supply cannot be stopped promptly. The feed/return unit that is connected in the energy transfer point to the energy distribution network can then charge, with this energy peak, the energy storage device that is connected to the direct current intermediate circuit.

A charge of the energy storage device above a specified voltage/charge state limit value can be converted into thermal energy by using a highly dynamic chopper that is connected to the direct voltage intermediate circuit with the aid of an ohmic resistor into thermal energy (overcharge protection).

In the case of the method in accordance with the invention for power management in an energy distribution network, a prevailing actual network state of an energy distribution network is ascertained particularly promptly, the actual network state being in particular respective electrical variables, such as voltage, current, phase position and/or frequency. Furthermore, an energy output or also energy intake (energy output/intake, energy feed/return) of the energy feed/return unit, in particular into/out of the energy distribution network is brought about dependent on the ascertained actual network state.

It is possible to provide that the ascertained actual network state is compared with a pre-determinable (desired network) state, such as in the form of a desired or safety-relevant limit value, and dependent on the comparison the energy output/intake (energy feed/return) is brought about in particular into an energy distribution network—of the energy feed/return unit.

The arrangement in accordance with the invention for implementing the method for power management in an energy distribution network provides the control unit.

The invention consequently renders it possible to control accordingly in a closed loop manner the electrical variables in the form of voltage, current, frequency and phase position of an energy distribution network, and to maintain these variables for a period of time.

Consequently, it is possible via the invention to avoid network disturbances in an energy distribution network, the network disturbances being caused in particular by deviating (actual) rotational speeds of combustion engines of corresponding generator sources, or rather in particular to compensate for the disturbances in a dynamic, prompt and surge-free manner and the invention also renders it possible as a consequence to continuously correct and dynamically support the energy distribution network.

It is provided in accordance with another preferred further development that the energy feed/return unit comprises a line commutated inverter based on rapidly connecting power semiconductors for controlling the energy in the direct current circuit. Due to the system, the inverter is able to feed electrical energy to a physical energy storage device that is connected directly or indirectly to the direct current circuit, the energy storage device being by way of example a capacitor, or rather the inverter is able to return the energy from the storage medium either directly or via the line commutated inverter to the energy distribution network.

In accordance with another preferred further embodiment, the electrical variable that is deviating from a desired set value is controlled at the energy transfer point via the energy feed/return unit and the control unit such that a closed loop control technology-related deficiency ("sluggish performance") of the generator source(s), such as the gas-operated combustion engine/generator unit is compensated for (dynamic effect), the transfer distance(s) from the generator source(s) to the transfer point (static effects) and/or the generator source(s) is/are unburdened of currents that do not contribute to the effective power and, consequently, the generator source(s) does/do not require to be electrically and mechanically over-dimensioned.

If the electrical compensation is performed in a transfer unit, such as in a transformer, at the energy transfer point, then this has a positive effect on the dimensioning of the transfer unit.

In accordance with another preferred further embodiment, the "coordination/management" in accordance with the invention is performed such that the control unit is configured in such that the static energy feed/return unit is controlled in such a manner that in a static steady feed state of the generator source(s) the form of the electrical variables is not influenced. In other words, if the voltage, current, phase position and the frequency in the energy distribution network correspond statically to the desired set value, then the energy feed/return unit can be deactivated or switched into a stand-by operation.

The "coordination/management" in accordance with the invention can also be performed such that, via the energy feed/return unit, the energy transfer point/energy feed point is dynamically influenced such (reactive power, effective power) that a closed loop control unit of the generator of the combustion engine/generator unit does not recognize any deviation from the operation conditions and the closed loop control unit does not cause any closed loop control activities, or rather defect recognition and limitation in the case of the combustion engine/generator unit. Loadings on the combustion engine/generator unit can consequently be reduced.

The "correction/compensation engine" from the energy feed/return unit can be supplied directly to the energy feed-in point.

Alternatively, energy can be fed into a potential-free auxiliary winding with a higher voltage. This winding is to be designed in accordance with a required permanent reactive power. It is then possible to supply the supporting power for a short period of time, such as for a few 100 ms, to exploit an overload capability of this winding, cables and the energy feed-in units.

In accordance with yet another preferred further embodiment, the energy distribution network, such as a local low voltage network, that comprises the coupled energy feed/return unit, is coupled to a further energy distribution network, such as by a medium voltage network. For this purpose, a medium voltage switch can be provided that is likewise controlled by the control unit. Consequently, it is rendered possible that, dependent on the network state and energy feed conditions, an under voltage release is delayed in a need-orientated manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and its design and advantages are described in detail hereinunder with reference to an exemplary embodiment with reference to the figures. Lines (continuous and also broken) that are illustrated in the figures between elements characterize functional, logical and/or physical connections, such as electrical signal or data cables between the elements, by way of which signals, data, amongst others, can be transferred or rather exchanged between the elements, in which figures.

DETAILED DESCRIPTION OF THE EXEMPLARY EMBODIMENTS

Figure 1:
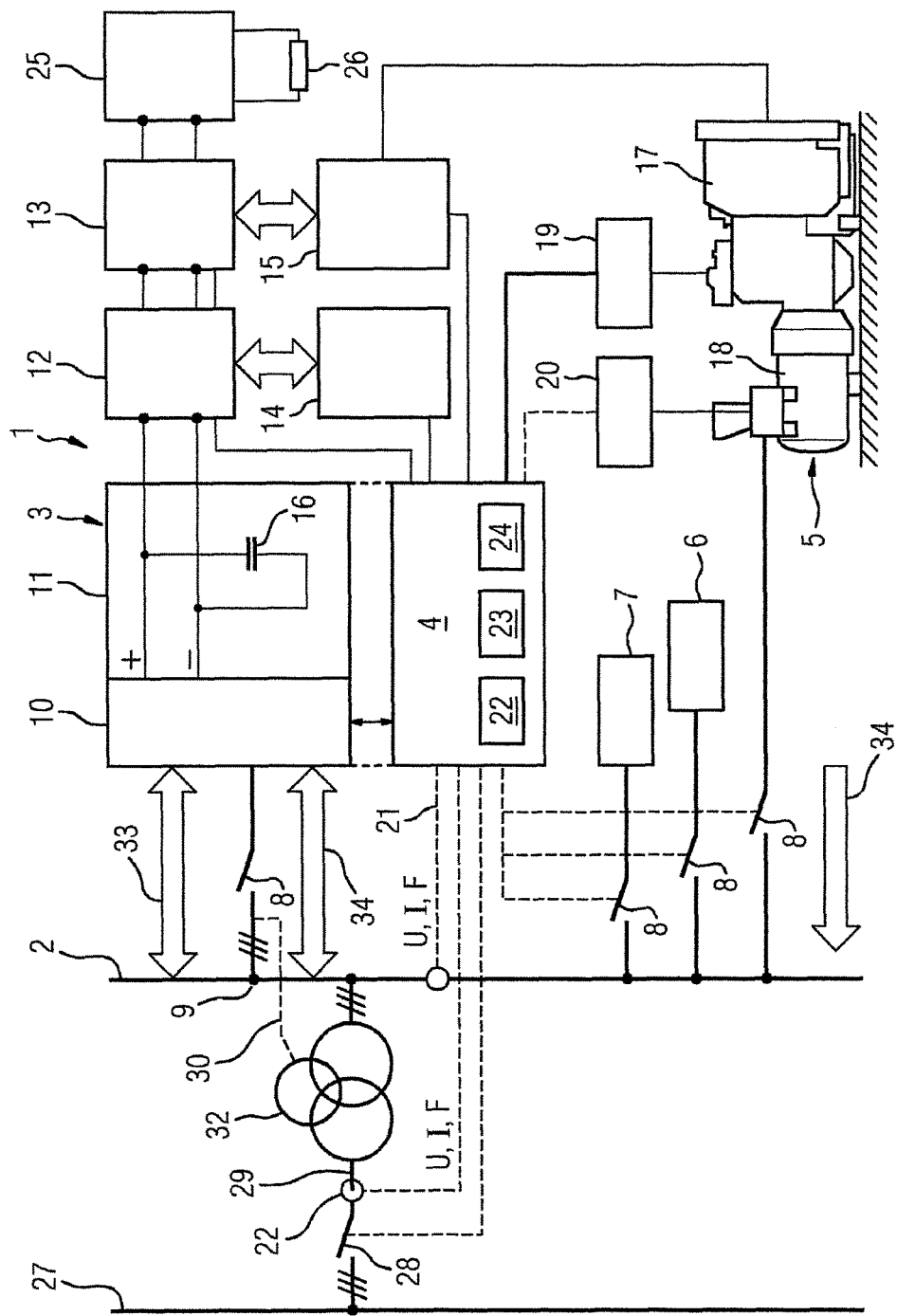
FIG. 1 illustrates a schematic illustration of a network compensating arrangement for an electrical energy distribution network having a static energy feed/regeneration unit, a combustion engine/generator unit and a control unit (LGC) in accordance with an embodiment of the invention.

FIG. 1 shows a network compensating arrangement for an electrical energy distribution network for the purpose of continuously correcting network disturbances and dynamically supporting the energy distribution network.

With specific reference to FIG. 1, illustrated therein is a network compensating arrangement 1 for a local low voltage network 2 that is supplied with electrical energy (effective/supporting power 34) via various energy generators 5, 6, 7 for the purpose of continuously correcting network disturbances and for dynamically supporting the low voltage network 2.

In detail, FIG. 1 illustrates one of these energy generators, a gas-operated combustion engine/generator unit 5; two further energy generators 6, 7 are schematically illustrated, and can be other types of combustion engine/generator units, such as diesel-operated combustion engine/generator units or also other types of energy sources.

The gas-operated combustion engine/generator unit 5 combines a gas-operated combustion engine 17 with a generator 18. Both the gas-operated combustion engine 17 and the generator 18 are controlled via a respective control unit, in this case a closed loop engine control/management system 19 or rather a closed loop generator control/management system 20. By way of example, it is thus possible, with these closed loop control units, to automatically control ignition, the point in time at which ignition occurs, and fuel mixture preparation of the gas-operated combustion engine/generator unit 5, or rather of the gas-operated combustion engine 17 in order thus to influence the operating and power state of the gas-operated combustion engine/generator unit 5.

As illustrated in the FIG. 1, each energy generator 5, 6, 7 is connected to the low voltage network 2 by a controllable switch 8.

Due to the special characteristics of a combustion engine/generator unit, such as sluggish performance of the fuel of the combustion engine and/or inertia of rotating components of the combustion engine/generator unit (dynamic effects), it can occur that the combustion engine/generator unit generates energy peaks in the case of (actual) rotational speeds of the combustion engine that deviate from desired rotational speeds and this has a disturbing effect on the energy distribution network, in this case the low voltage network 2.

In addition, it is possible, for example, that due to a drop or an increase in the network voltage in the energy distribution network or rather low voltage network 2 (e.g. short circuit in the network), for network disturbances to occur that in turn produce a loading or unloading effect on the combustion engine/generator unit.

It is possible via the illustrated network compensating device 1 to continuously correct such network disturbances (that are caused by network and/or energy generators) and to dynamically support the low voltage network 2.

As illustrated in the FIG. 1, the network compensating arrangement 1 comprises a static energy feed/return unit (hereinunder referred to as an energy feed/return unit) 3 and also a measuring unit, a closed loop control unit and a control unit, a "local grid controller" (LGC), 4.

The energy feed/return unit 3 and the LGC 4 are coupled to one another such that the energy feed/return unit 3, within the scope of an intelligent power/energy management system (for the low voltage network 2), can be controlled via the LGC 4.

As is also illustrated in FIG. 1, the LGC 4 is connected for this purpose to the low voltage network 2 via a connection line 21, as a consequence of which the LGC 4 ascertains, via an electronic measuring unit 22 or rather equipped with a corresponding electronic measuring unit 22, the prevailing actual network state of the low voltage network 2, in this case the electrical variables: voltage U, current I and frequency F.

By way of comparing the ascertained actual network state with one (or more) predetermined desired states, or also other states, limit values amongst others, the LGC 4 is able to recognize any type of network disturbance in the low voltage network 2.

The LGC 4 is further configured such that, dependent on the ascertained actual network state, or the actual, desired comparison, and a possibly recognized network disturbance, it controls the energy feed/return unit 3 and the power/energy management system, as explained hereinunder in detail.

In short, the LGC 4 "coordinates/manages" (as the central control unit) the entire system, explained here, with all its units (generator-transfer-storage units), in particular the energy feed/return unit 3 and the or rather its energy/power management system, dependent on the state of the low voltage network 2 to compensate for respective disturbances in a dynamic, prompt and/or surge-free manner, and also to protect the components of the entire system or rather of the generator-transfer-storage units from damage as a result of a limit value being exceeded.

As illustrated in the FIG. 1, the energy feed/return unit 3 is coupled at the energy transfer point/input point 9 to the low voltage network 2, by a controllable switch 8.

As further illustrated in the FIG. 1, the energy feed/return unit 3 comprises a line commutated converter 10, which can be operated in the two quadrant drive operation based on quickly switching a power semiconductor, a "local grid inverter" (LGI), and also a direct voltage intermediate circuit 11 that is connected to the LGI 10 and is referred to hereinunder also only as a direct voltage circuit.

In accordance with the present disclosed embodiments, the LGI 10 is able to feed energy to the direct voltage intermediate circuit 11, and also to draw energy from the direct voltage intermediate circuit 11. Likewise in accordance with the present disclosed embodiments, the LGI 10 is able, via the energy input point 9, draw energy from the low voltage network 2, and also to feed (return) energy to the low voltage network 2 energy (effective energy, supporting energy 34) and reactive power 33 (in order to maintain the network current) in the low voltage network 2, in other words on the network side to phase shift electrical variables, in particular current and voltage, with respect to one another.

As also illustrated in FIG. 1, for the purpose of converting energy into a chemical or rather mechanical form of energy and for correspondingly storing this energy, via a DC-DC inverter 12, 13, energy storage modules 14, 15, in this case a Li-battery 14 and a flywheel storage device 15, are connected to the direct voltage intermediate circuit 11.

Further chemical, mechanical and/or thermal energy storage devices can be provided in an appropriate arrangement and circuit.

Thermal, chemical and mechanical energy storage devices of this type, such as the illustrated Li-battery 14 or rather the flywheel storage device 15 are characterized by aging effects, such as also their charging and discharging that occurs in the time period of—greater several milliseconds.

As is further evident in FIG. 1, the direct voltage intermediate circuit 11 is connected to an electrical (also referred to here as physical) energy storage device 16, in this case a capacitor.

Electrical or rather physical energy storage devices of this type, such as the capacitor 16, render it possible (in contrast/different to the thermal, chemical and mechanical energy storage devices) to perform a charging and discharging procedure in a highly dynamic manner, in a short space of time, i.e., in the region of one or several milliseconds and in an aging resistant manner.

It is possible via these energy storage devices 14, 15 and that are connected to the direct current intermediate circuit (when the LGI is used in accordance with the specification) to generate the reactive power 33 (rendering it possible to maintain the network current) in the low voltage network 2 or rather to introduce the effective energy into the low voltage network 2 or draw said effective energy therefrom.

Thus, it is possible via the energy feed/return unit 2 and its energy storage device 14, 14, 16, to compensate in particular for specified symmetrical, cyclic fluctuations in energy levels in the low voltage network 2, such as an acyclic energy excess or rather a shortage of energy in the low voltage network 2, caused for example by the gas-operated combustion engine/generator unit 5, and consequently to compensate for network disturbances.

The transport of energy is encumbered with response times according to the physical or rather chemical characteristics of the selected energy storage device, 14, 15 and the electrical characteristics of its inverter or rather the inverters 12, 13. The selected energy storage devices 14, 15 are therefore selected according to the required response time, arranged and accordingly coordinated via the intelligent power management (by means of the LGC) in order in combination to cover the required response time period in the case of network disturbances.

Thus, highly dynamic correction variables are derived from the physical storage device 16, and less dynamic correction variables are derived from the chemical storage device 14 and the mechanical storage device 15. The limit for drawing energy from the physical storage device 16 or rather from the chemical/mechanical energy storage device 14, 15 is defined according to economic restraints.

Energy is automatically charged into the physical energy storage device 16 in the direct current intermediate circuit 11 via the desired set value/intermediate circuit voltage.

The charge state of the chemical and mechanical energy storage device 14, 15 is accordingly monitored via the LGC 4 and controlled such that its charge state is maintained at approx. 80%-90%.

The chemical and mechanical energy storage device 14, 15 can be charged with energy (to the preferred 80%-90% charge state) controllable via the LGC 4, via a preceding disturbance-free operation, of the gas-operated combustion engine/generator unit 5, or of another energy source (not illustrated), such as an inverter unit that is operated by waste heat (exhaust gas micro turbine) or such, based on renewable energies, or also by way of the low voltage network 2 (and LGI 10) itself.

A charge of the energy storage device 16 above a specified voltage limit value is converted into thermal energy by using a highly dynamic chopper 25 that is connected to the direct voltage intermediate circuit 11 with the aid of an ohmic resistor 26 (overcharge protection).

Once the storage charge of the physical energy storage device 16 or rather the chemical/mechanical storage device 14, 15 is completed, the energy that is made available from a generator source of this type is supplied via the energy feed/return unit 3 or rather via the LGI 10 or also directly to the low voltage network 2. The LGC 4 performs the corresponding control.

In order to control the participating generator-transfer-storage units in a closed loop and open loop manner within the scope of the power/energy management, the LGC 4, as illustrated in FIG. 1, is equipped with a model 23 of the generator-transfer-storage units, such as also with a process display archive 24 that contains operating events of the participating generator-transfer-storage units.

Based on the model 23 and/or the process display archive 24, responses of the participating generator-transfer-storage units (within the scope of the "coordination/management") are determined and coordinated in order to thus (pre-)control the entire system with all participating components surge-free and dynamically in a suitable manner, and to thereby compensate dynamically and in a surge-free manner for the network disturbances, arising by way of example from a closed loop control technology-related defect in the case of the gas-operated combustion engine/generator unit 5 or static effects in the case of the closed loop control technology-related transfer distances. An, otherwise generally provided or rather necessary, "energetic" over-dimensioning of the gas-operated combustion engine/generator unit 5 is omitted, the gas-operated combustion engine/generator unit 5 is unburdened of currents that do not contribute to the effective power by this control of the LGC within the scope of the power/energy management process.

Thus, by way of example also via the LGC 4, the closed loop control units 19, 20 of the gas-operated combustion motor 17 and the generator 18 are coordinated with one another using control technology dependent on the requirements of the low voltage network 2 in order to thus dynamically compensate (by way of example) for deviations of the gas-operated combustion engine 17 from the prevailing operating point or energy peaks in the form of excess rotational speeds in the case of gas-operated combustion engine 17 via correspondingly influencing ignition, the point in time at which ignition occurs and fuel mixture preparation (engine management).

For the purpose of the dynamic open loop control of the power output of the gas-operated combustion engine 17, a partial switch-off of ignition circuits is appropriate and it is also appropriate to influence the point in time at which ignition occurs. This type of procedure is also coordinated by the LGC 4 via correspondingly controlling and coordinating the closed loop control units 19, 20 of the gas-operated combustion engine 17 and the generator 18.

In the event of an electrical load shedding, the rotational speeds of the gas-operated combustion engine 17 tend to over-vibrate (which leads to energy peaks in the low voltage network 2) because, due to the special characteristics of a gas-operated combustion engine, the energy supply cannot be stopped promptly. When controlled by the LGC 4, it is then possible with these energy peaks to charge the energy storage devices 16 or rather 14, 15 of the energy feed/return unit 3, the energy storage devices being connected to the direct voltage intermediate circuit 11. The over-charge protection for the physical energy storage device 16 is ensured by the chopper 25 and the ohmic resistor 26.

The LGC 4 also controls the energy feed/return unit 3 so that in a static steady feed state of the gas-operated combustion engine/generator unit 5, the form of the electrical variables is not influenced. In other words, if the voltage, current, phase position and the frequency in the low voltage network 2 corresponds in a static manner to the desired set value (and is detected as such by the LGC 4), the energy feed/return unit 3 can be deactivated or switched into a stand-by operation.

The LGC 4 also controls the reactive power (output/intake) 33 or the effective/supporting power (output/intake) 34 of the energy feed/return unit 3 at the energy input point 9 such that the closed loop control unit 20 of the generator does not recognize a deviation from the operating conditions and the closed loop control units 19, 20 do not cause any control loop control activities, or rather defect recognition and limitation in the case of gas-operated combustion engine/generator unit 5.

As further illustrated in FIG. 1, the local low voltage network 2 is further coupled (by a connection/connection cable 29) to a medium voltage network 27.

A medium voltage switch 28 is arranged in the connection/connection cable 29 and the medium voltage switch is likewise controlled by the LGC 4. An electronic measuring unit 22 is also provided at this location, and the LGC 4 ascertains respective electrical variables by the electronic measuring unit.

Consequently, it becomes possible that, dependent on the network state and energy feed condition, an under voltage release is delayed in a need-orientated manner.

FIG. 1 further illustrates an alternative energy supply 30 of the energy feed/return unit 3.

As clear from FIG. 1, the energy feed/return unit 3 supplies a potential-free auxiliary winding (reactive power winding) of a transformer 32 with a higher voltage. This winding is embodied according to a required permanent reactive power. In order to supply the supporting power for a short period of time, such as for a few 100 ms, the overload capability of this winding, cables and the energy feed/return unit 3 is exploited.

Although the invention has been further illustrated and described in detail with reference to the preferred exemplary embodiments, the invention is not limited to the disclosed examples and other variations can be derived therefrom by the person skilled in the art without departing from the protective scope of the invention.

Figure 2:
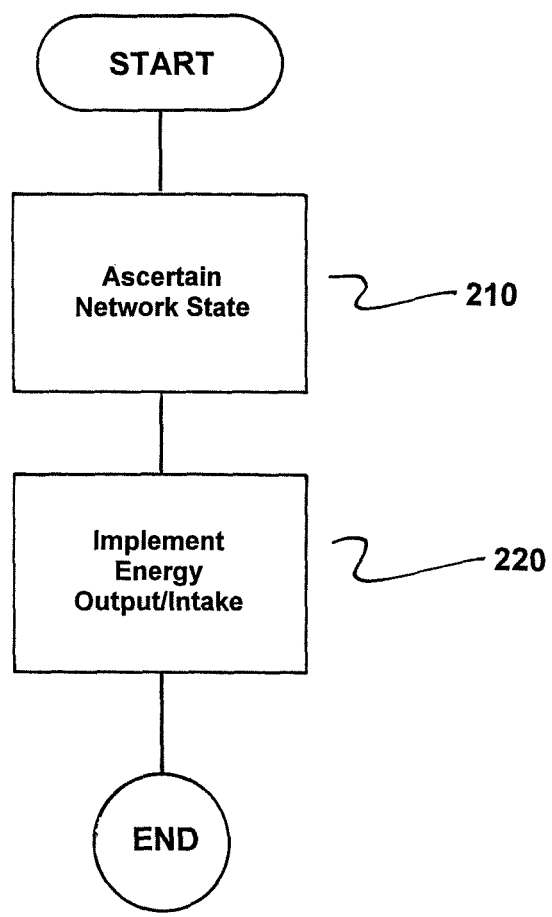
FIG. 2 is a flowchart of the method in accordance with the invention.

FIG. 2 is a flowchart of a method for power management in an energy distribution network. The method comprises ascertaining the prevailing actual network state of the energy distribution network (2), as indicated in step 210. Next, an energy output/intake (energy feed/return) of an energy feed/return unit (3) into the energy distribution network (2) dependent on the ascertained actual network state is implemented, as indicated in step 220.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An arrangement for power management in an energy distribution network, the arrangement being configured to dynamically support the energy distribution network and compensate for network disturbances in the energy distribution network via energy output/intake to/from the energy distribution network, the arrangement comprising:
   an energy feed/return unit for feeding/returning energy to/from the energy distribution network and having a direct current intermediate circuit;
   at least two different electrical energy storage devices connected to the direct current intermediate circuit of the energy feed/return unit and having different response times; and
   a control unit configured to:
      ascertain a prevailing actual network state of the energy distribution network by measuring electrical variables of the energy distribution network, said electrical variables including at least one of voltage, current, phase position and frequency, and compare the ascertained prevailing actual network state with a desired network state,
      control, dependent on the comparison, the energy feed/return unit to output energy to the energy distribution network or receive energy from the energy distribution network, and
      select and coordinate the at least two electrical energy storage devices in accordance with their respective response times to cover a required response time period during network disturbances.

2. The arrangement for power management in the energy distribution network as claimed in claim 1, wherein the energy feed/return unit comprises a converter which is operable in one of a two quadrant operation or four quadrant operation, said converter being at least one of (i) a line commutated inverter in the two quadrant operation and (ii) a direct current intermediate circuit that is connected to the converter operable in one of the two quadrant operation or four quadrant operation.

3. The arrangement for power management in the energy distribution network as claimed in claim 1, wherein the at least two different electrical energy storage devices comprise a chemical energy storage device and at least one of (i) a mechanical energy storage device and a thermal energy storage device.

4. The arrangement for power management in the energy distribution network as claimed in claim 1, further comprising:
a capacitor which is connected to the direct current intermediate circuit of the energy feed/return unit.

5. The arrangement for power management in the energy distribution network as claimed in claim 1, wherein the arrangement is connected to the energy distribution network and the energy distribution network comprises a local low voltage network; and wherein a gas operated combustion engine/generator unit controllable via the control unit is connected to the energy distribution network.

6. A method for power management in an energy distribution network via an arrangement configured to dynamically support the energy distribution network and compensate for network disturbances in the energy distribution network via energy output/intake to/from the energy distribution network, the arrangement including an energy feed/return unit for feeding/returning energy to/from the energy distribution network and having a direct current intermediate circuit, at least two different electrical energy storage devices connected to the direct current intermediate circuit of the energy feed/return unit and having different response times and a control unit, the method comprising:
ascertaining, by the control unit, a prevailing actual network state of the energy distribution network by measuring electrical variables of the energy distribution network, said electrical variables including at least one of voltage, current, phase position and frequency, and compare the ascertained prevailing actual network state with a desired network state;
controlling, by the control unit, dependent on the comparison, the energy feed/return unit to output energy to the energy distribution network or receive energy from the energy distribution network; and
selecting and coordinating, by the control unit, the at least two electrical energy storage devices in accordance with their respective response times to cover a required response time period during network disturbances.

7. The method for power management in an energy distribution network as claimed in claim 6, wherein the energy feed/return unit comprises a converter which is operable in one of a two quadrant operation or four quadrant operation, said converter being at least one of (i) a line commutated inverter in the two quadrant operation and (ii) a direct current intermediate circuit that is connected to the converter operable in one of the two quadrant operation or four quadrant operation.

8. An arrangement for implementing a method for power management in an energy distribution network, the method comprising ascertaining a prevailing actual network state of the energy distribution network by measuring electrical variables of the energy distribution network, said electrical variables including at least one of voltage, current, phase position and frequency, and comparing the ascertained prevailing actual network state with a desired network state, by controlling, dependent on the comparison, the energy feed/return unit to output energy to the energy distribution network or receive energy from the energy distribution network, and by selecting and coordinating the at least two electrical energy storage devices in accordance with their respective response times to cover a required response time period during network disturbances, the arrangement comprising:
an energy feed/return unit for feeding/returning energy to/from the energy distribution network and having a direct current intermediate circuit;
at least two different electrical energy storage devices connected to the direct current intermediate circuit of the energy feed/return unit and having different response times; and
a control unit configured to ascertain the prevailing actual network state of the energy distribution network by measurement of electrical variables of the energy distribution network, said electrical variables including at least one of the voltage, current, phase position and frequency, and to compare the ascertained prevailing actual network state with the desired network state, control, dependent on the comparison, the energy feed/return unit to output energy to the energy distribution network or receive energy from the energy distribution network, and select and coordinate the at least two electrical energy storage devices in accordance with their respective response times to cover the required response time period during the network disturbances.

* * * * *